US008923385B2

(12) United States Patent
Garg et al.

(10) Patent No.: US 8,923,385 B2
(45) Date of Patent: Dec. 30, 2014

(54) REWIND-ENABLED HARDWARE ENCODER

(75) Inventors: Atul Garg, Sunnyvale, CA (US);
Prahlad Venkatapuram, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 1583 days.

(21) Appl. No.: 12/113,796

(22) Filed: May 1, 2008

(65) Prior Publication Data

US 2009/0273606 A1 Nov. 5, 2009

(51) Int. Cl.
*G06K 9/36* (2006.01)
*H04N 19/436* (2014.01)
*H04N 19/184* (2014.01)
*H04N 19/61* (2014.01)
*H04N 19/176* (2014.01)

(52) U.S. Cl.
CPC ... *H04N 19/00521* (2013.01); *H04N 19/00309* (2013.01); *H04N 19/00781* (2013.01); *H04N 19/00278* (2013.01)
USPC .......................................... 375/240; 382/232

(58) Field of Classification Search
USPC ............. 375/240.01, 240.03, 240.12, 240.16, 375/240.18; 382/173, 232, 239, 240, 248, 382/260
See application file for complete search history.

(56) References Cited

U.S. PATENT DOCUMENTS

| | | | |
|---|---|---|---|
| 3,091,657 A | 5/1963 | Stuessel | |
| 3,614,740 A | 10/1971 | Delagi et al. | |
| 3,987,291 A | 10/1976 | Gooding et al. | |
| 4,101,960 A | 7/1978 | Stokes et al. | |
| 4,208,810 A | 6/1980 | Rohner et al. | |
| 4,541,046 A | 9/1985 | Nagashima et al. | |
| 4,566,005 A | 1/1986 | Apperley et al. | |
| 4,748,585 A | 5/1988 | Chiarulli et al. | |
| 4,897,717 A | 1/1990 | Hamilton et al. | |
| 4,918,626 A | 4/1990 | Watkins et al. | |

(Continued)

FOREIGN PATENT DOCUMENTS

| | | |
|---|---|---|
| CN | 101093578 | 12/2007 |
| DE | 29606102 | 4/1996 |

(Continued)

OTHER PUBLICATIONS

"Alpha Testing State"; http://msdn.microsoft.com/library/en-us/directx9_c/directx/graphics/programmingguide/GettingStarted/Direct3Kdevices/States/renderstates/alphatestingstate.asp Mar. 25, 2005.

(Continued)

*Primary Examiner* — Habte Mered
*Assistant Examiner* — Prince A Mensah

(57) ABSTRACT

Described herein are a number of approaches for implementing a video encoder with hardware-enabled rewind functionality. In several embodiments, rewind functionality can be implemented in hardware, in a manner which allows the transform engine of the encoder to reprocess video data, without requesting data from other stages in the encoder. Such rewind functionality is useful in implementing some video standards in a pipeline architecture, such as the H.264 standard. In one embodiment, a method of encoding video data is described, which involves obtaining a first portion of video data from a first location in a buffer, and performing an encoding operation on it. The second portion of video data is obtained from a second location in the buffer, and encoding operations begin on the second portion. The first portion of video data can be retrieved from the first location, in order to reprocess the first portion if necessary.

16 Claims, 6 Drawing Sheets

Encoder 500

(56) References Cited

U.S. PATENT DOCUMENTS

| | | |
|---|---|---|
| 4,958,303 A | 9/1990 | Assarpour et al. |
| 4,965,716 A | 10/1990 | Sweeney |
| 4,965,751 A | 10/1990 | Thayer et al. |
| 4,985,848 A | 1/1991 | Pfeiffer et al. |
| 5,040,109 A | 8/1991 | Bowhill et al. |
| 5,047,975 A | 9/1991 | Patti et al. |
| 5,081,594 A | 1/1992 | Horsley |
| 5,175,828 A | 12/1992 | Hall et al. |
| 5,179,530 A | 1/1993 | Genusov et al. |
| 5,197,130 A | 3/1993 | Chen et al. |
| 5,210,834 A | 5/1993 | Zurawski et al. |
| 5,263,136 A | 11/1993 | DeAguiar et al. |
| 5,287,438 A | 2/1994 | Kelleher |
| 5,313,287 A | 5/1994 | Barton |
| 5,327,369 A | 7/1994 | Ashkenazi |
| 5,357,623 A | 10/1994 | Megory-Cohen |
| 5,375,223 A | 12/1994 | Meyers et al. |
| 5,388,206 A | 2/1995 | Poulton et al. |
| 5,388,245 A | 2/1995 | Wong |
| 5,418,973 A | 5/1995 | Ellis et al. |
| 5,421,029 A | 5/1995 | Yoshida |
| 5,430,841 A | 7/1995 | Tannenbaum et al. |
| 5,430,884 A | 7/1995 | Beard et al. |
| 5,432,898 A | 7/1995 | Curb et al. |
| 5,432,905 A | 7/1995 | Hsieh et al. |
| 5,446,836 A | 8/1995 | Lentz et al. |
| 5,452,104 A | 9/1995 | Lee |
| 5,452,412 A | 9/1995 | Johnson, Jr. et al. |
| 5,483,258 A | 1/1996 | Cornett et al. |
| 5,517,666 A | 5/1996 | Ohtani et al. |
| 5,522,080 A | 5/1996 | Harney |
| 5,543,935 A | 8/1996 | Harrington |
| 5,560,030 A | 9/1996 | Guttag et al. |
| 5,561,808 A | 10/1996 | Kuma et al. |
| 5,570,463 A | 10/1996 | Dao |
| 5,574,944 A | 11/1996 | Stager |
| 5,594,854 A | 1/1997 | Baldwin et al. |
| 5,610,657 A | 3/1997 | Zhang |
| 5,623,692 A | 4/1997 | Priem et al. |
| 5,627,988 A | 5/1997 | Oldfield |
| 5,633,297 A | 5/1997 | Valko et al. |
| 5,644,753 A | 7/1997 | Ebrahim et al. |
| 5,649,173 A | 7/1997 | Lentz |
| 5,664,162 A | 9/1997 | Dye |
| 5,666,169 A | 9/1997 | Ohki et al. |
| 5,682,552 A | 10/1997 | Kuboki et al. |
| 5,682,554 A | 10/1997 | Harrell |
| 5,706,478 A | 1/1998 | Dye |
| 5,708,511 A | 1/1998 | Gandhi et al. |
| 5,754,191 A | 5/1998 | Mills et al. |
| 5,761,476 A | 6/1998 | Martell |
| 5,764,243 A | 6/1998 | Baldwin |
| 5,784,590 A | 7/1998 | Cohen et al. |
| 5,784,640 A | 7/1998 | Asghar et al. |
| 5,796,974 A | 8/1998 | Goddard et al. |
| 5,802,574 A | 9/1998 | Atallah et al. |
| 5,809,524 A | 9/1998 | Singh et al. |
| 5,812,147 A | 9/1998 | Van Hook et al. |
| 5,815,162 A | 9/1998 | Levine |
| 5,835,740 A | 11/1998 | Wise et al. |
| 5,835,788 A | 11/1998 | Blumer et al. |
| 5,848,192 A | 12/1998 | Smith et al. |
| 5,848,254 A | 12/1998 | Hagersten |
| 5,854,631 A | 12/1998 | Akeley et al. |
| 5,854,637 A | 12/1998 | Sturges |
| 5,872,902 A | 2/1999 | Kuchkuda et al. |
| 5,920,352 A | 7/1999 | Inoue |
| 5,925,124 A | 7/1999 | Hilgendorf et al. |
| 5,940,090 A | 8/1999 | Wilde |
| 5,940,858 A | 8/1999 | Green |
| 5,949,410 A | 9/1999 | Fung |
| 5,950,012 A | 9/1999 | Shiell et al. |
| 5,977,987 A | 11/1999 | Duluk, Jr. |
| 5,978,838 A | 11/1999 | Mohamed et al. |
| 5,999,199 A | 12/1999 | Larson |
| 6,009,454 A | 12/1999 | Dummermuth |
| 6,016,474 A | 1/2000 | Kim et al. |
| 6,028,608 A | 2/2000 | Jenkins |
| 6,034,699 A | 3/2000 | Wong et al. |
| 6,041,399 A | 3/2000 | Terada et al. |
| 6,049,672 A | 4/2000 | Shiell et al. |
| 6,072,500 A | 6/2000 | Foran et al. |
| 6,073,158 A | 6/2000 | Nally et al. |
| 6,092,094 A | 7/2000 | Ireton |
| 6,104,407 A | 8/2000 | Aleksic et al. |
| 6,104,417 A | 8/2000 | Nielsen et al. |
| 6,108,766 A | 8/2000 | Hahn et al. |
| 6,112,019 A | 8/2000 | Chamdani et al. |
| 6,115,049 A | 9/2000 | Winner et al. |
| 6,118,394 A | 9/2000 | Onaya |
| 6,128,000 A | 10/2000 | Jouppi et al. |
| 6,131,152 A | 10/2000 | Ang et al. |
| 6,137,918 A | 10/2000 | Harrington et al. |
| 6,141,740 A | 10/2000 | Mahalingaiah et al. |
| 6,144,392 A | 11/2000 | Rogers |
| 6,150,610 A | 11/2000 | Sutton |
| 6,160,557 A | 12/2000 | Narayanaswami |
| 6,188,394 B1 | 2/2001 | Morein et al. |
| 6,189,068 B1 | 2/2001 | Witt et al. |
| 6,192,073 B1 | 2/2001 | Reader et al. |
| 6,192,458 B1 | 2/2001 | Arimilli et al. |
| 6,201,545 B1 | 3/2001 | Wong et al. |
| 6,204,859 B1 | 3/2001 | Jouppi et al. |
| 6,208,361 B1 | 3/2001 | Gossett |
| 6,209,078 B1 | 3/2001 | Chiang et al. |
| 6,219,070 B1 | 4/2001 | Baker et al. |
| 6,222,552 B1 | 4/2001 | Haas et al. |
| 6,230,254 B1 | 5/2001 | Senter et al. |
| 6,239,810 B1 | 5/2001 | Van Hook et al. |
| 6,247,094 B1 | 6/2001 | Kumar et al. |
| 6,249,853 B1 | 6/2001 | Porterfield |
| 6,252,610 B1 | 6/2001 | Hussain |
| 6,259,460 B1 | 7/2001 | Gossett et al. |
| 6,292,886 B1 | 9/2001 | Makineni et al. |
| 6,301,299 B1 * | 10/2001 | Sita et al. ............... 375/240.01 |
| 6,301,600 B1 | 10/2001 | Petro et al. |
| 6,314,493 B1 | 11/2001 | Luick |
| 6,317,819 B1 | 11/2001 | Morton |
| 6,323,874 B1 | 11/2001 | Gossett |
| 6,351,808 B1 | 2/2002 | Joy et al. |
| 6,359,623 B1 | 3/2002 | Larson |
| 6,362,819 B1 | 3/2002 | Dalal et al. |
| 6,366,289 B1 | 4/2002 | Johns |
| 6,370,617 B1 | 4/2002 | Lu et al. |
| 6,429,877 B1 | 8/2002 | Stroyan |
| 6,437,780 B1 | 8/2002 | Baltaretu et al. |
| 6,437,789 B1 | 8/2002 | Tidwell et al. |
| 6,438,664 B1 | 8/2002 | McGrath et al. |
| 6,452,595 B1 | 9/2002 | Montrym et al. |
| 6,469,707 B1 | 10/2002 | Voorhies |
| 6,480,205 B1 | 11/2002 | Greene et al. |
| 6,480,927 B1 | 11/2002 | Bauman |
| 6,490,654 B2 | 12/2002 | Wickeraad et al. |
| 6,496,902 B1 | 12/2002 | Faanes et al. |
| 6,499,090 B1 | 12/2002 | Hill et al. |
| 6,501,564 B1 | 12/2002 | Schramm et al. |
| 6,504,542 B1 | 1/2003 | Voorhies et al. |
| 6,522,329 B1 | 2/2003 | Ihara et al. |
| 6,525,737 B1 | 2/2003 | Duluk, Jr. et al. |
| 6,529,201 B1 | 3/2003 | Ault et al. |
| 6,529,207 B1 | 3/2003 | Landau et al. |
| 6,587,506 B1 * | 7/2003 | Noridomi et al. ........ 375/240.12 |
| 6,597,357 B1 | 7/2003 | Thomas |
| 6,603,481 B1 | 8/2003 | Kawai et al. |
| 6,606,093 B1 | 8/2003 | Gossett et al. |
| 6,611,272 B1 | 8/2003 | Hussain et al. |
| 6,614,444 B1 | 9/2003 | Duluk, Jr. et al. |
| 6,614,448 B1 | 9/2003 | Garlick et al. |
| 6,624,818 B1 | 9/2003 | Mantor et al. |
| 6,624,823 B2 | 9/2003 | Deering |
| 6,629,188 B1 | 9/2003 | Minkin et al. |
| 6,631,423 B1 | 10/2003 | Brown et al. |
| 6,631,463 B1 | 10/2003 | Floyd et al. |
| 6,633,197 B1 | 10/2003 | Sutardja |

(56) References Cited

U.S. PATENT DOCUMENTS

| | | |
|---|---|---|
| 6,633,297 B2 | 10/2003 | McCormack et al. |
| 6,646,639 B1 | 11/2003 | Greene et al. |
| 6,657,635 B1 | 12/2003 | Hutchins et al. |
| 6,658,447 B2 | 12/2003 | Cota-Robles |
| 6,671,000 B1 | 12/2003 | Cloutier |
| 6,674,841 B1 | 1/2004 | Johns et al. |
| 6,693,637 B2 | 2/2004 | Koneru et al. |
| 6,693,639 B2 | 2/2004 | Duluk, Jr. et al. |
| 6,697,063 B1 | 2/2004 | Zhu |
| 6,700,588 B1 | 3/2004 | MacInnis et al. |
| 6,715,035 B1 | 3/2004 | Colglazier et al. |
| 6,717,576 B1 | 4/2004 | Duluk, Jr. et al. |
| 6,717,578 B1 | 4/2004 | Deering |
| 6,732,242 B2 | 5/2004 | Hill et al. |
| 6,734,861 B1 | 5/2004 | Van Dyke et al. |
| 6,741,247 B1 | 5/2004 | Fenney |
| 6,747,057 B2 | 6/2004 | Ruzafa et al. |
| 6,765,575 B1 | 7/2004 | Voorhies et al. |
| 6,778,177 B1 | 8/2004 | Furtner |
| 6,788,301 B2 | 9/2004 | Thrasher |
| 6,798,410 B1 | 9/2004 | Redshaw et al. |
| 6,803,916 B2 | 10/2004 | Ramani et al. |
| 6,809,732 B2 | 10/2004 | Zatz et al. |
| 6,812,929 B2 | 11/2004 | Lavelle et al. |
| 6,819,332 B2 | 11/2004 | Baldwin |
| 6,825,843 B2 | 11/2004 | Allen et al. |
| 6,825,848 B1 | 11/2004 | Fu et al. |
| 6,833,835 B1 | 12/2004 | van Vugt |
| 6,839,062 B2 | 1/2005 | Aronson et al. |
| 6,862,027 B2 | 3/2005 | Andrews et al. |
| 6,891,543 B2 | 5/2005 | Wyatt |
| 6,906,716 B2 | 6/2005 | Moreton et al. |
| 6,915,385 B1 | 7/2005 | Leasure et al. |
| 6,938,176 B1 | 8/2005 | Alben et al. |
| 6,940,514 B1 | 9/2005 | Wasserman et al. |
| 6,944,744 B2 | 9/2005 | Ahmed et al. |
| 6,947,057 B2 | 9/2005 | Nelson et al. |
| 6,952,214 B2 | 10/2005 | Naegle et al. |
| 6,956,579 B1 | 10/2005 | Diard et al. |
| 6,961,057 B1 | 11/2005 | Van Dyke et al. |
| 6,965,982 B2 | 11/2005 | Nemawarkar |
| 6,975,324 B1 | 12/2005 | Valmiki et al. |
| 6,976,126 B2 | 12/2005 | Clegg et al. |
| 6,978,149 B1 | 12/2005 | Morelli et al. |
| 6,978,317 B2 | 12/2005 | Anantha et al. |
| 6,978,457 B1 | 12/2005 | Johl et al. |
| 6,981,106 B1 | 12/2005 | Bauman et al. |
| 6,985,151 B1 | 1/2006 | Bastos et al. |
| 7,002,591 B1 | 2/2006 | Leather et al. |
| 7,009,607 B2 | 3/2006 | Lindholm et al. |
| 7,009,615 B1 | 3/2006 | Kilgard et al. |
| 7,015,909 B1 | 3/2006 | Morgan, III et al. |
| 7,031,330 B1 | 4/2006 | Bianchini, Jr. |
| 7,032,097 B2 | 4/2006 | Alexander et al. |
| 7,035,979 B2 | 4/2006 | Azevedo et al. |
| 7,061,495 B1 | 6/2006 | Leather |
| 7,064,771 B1 | 6/2006 | Jouppi et al. |
| 7,075,542 B1 | 7/2006 | Leather |
| 7,081,902 B1 | 7/2006 | Crow et al. |
| 7,119,809 B1 | 10/2006 | McCabe |
| 7,126,600 B1 | 10/2006 | Fowler et al. |
| 7,148,888 B2 | 12/2006 | Huang |
| 7,151,544 B2 | 12/2006 | Emberling |
| 7,154,066 B2 | 12/2006 | Talwar et al. |
| 7,154,500 B2 | 12/2006 | Heng et al. |
| 7,158,148 B2 | 1/2007 | Toji et al. |
| 7,159,212 B2 | 1/2007 | Schenk et al. |
| 7,170,515 B1 | 1/2007 | Zhu |
| 7,184,040 B1 | 2/2007 | Tzvetkov |
| 7,185,178 B1 | 2/2007 | Barreh et al. |
| 7,202,872 B2 | 4/2007 | Paltashev et al. |
| 7,224,364 B1 | 5/2007 | Yue et al. |
| 7,260,677 B1 | 8/2007 | Vartti et al. |
| 7,305,540 B1 | 12/2007 | Trivedi et al. |
| 7,307,628 B1 | 12/2007 | Goodman et al. |
| 7,307,638 B2 | 12/2007 | Leather et al. |
| 7,321,787 B2 | 1/2008 | Kim |
| 7,334,110 B1 | 2/2008 | Faanes et al. |
| 7,369,815 B2 | 5/2008 | Kang et al. |
| 7,373,478 B2 | 5/2008 | Yamazaki |
| 7,382,368 B1 | 6/2008 | Molnar et al. |
| 7,406,698 B2 | 7/2008 | Richardson |
| 7,412,570 B2 | 8/2008 | Moll et al. |
| 7,453,466 B2 | 11/2008 | Hux et al. |
| 7,483,029 B2 | 1/2009 | Crow et al. |
| 7,486,290 B1 | 2/2009 | Kilgariff et al. |
| 7,487,305 B2 | 2/2009 | Hill et al. |
| 7,493,452 B2 | 2/2009 | Eichenberger et al. |
| 7,545,381 B2 | 6/2009 | Huang et al. |
| 7,548,996 B2 | 6/2009 | Baker et al. |
| 7,551,174 B2 | 6/2009 | Iourcha et al. |
| 7,564,460 B2 | 7/2009 | Boland et al. |
| 7,633,506 B1 | 12/2009 | Leather et al. |
| 7,634,637 B1 | 12/2009 | Lindholm et al. |
| 7,714,747 B2 | 5/2010 | Fallon |
| 7,750,913 B1 | 7/2010 | Parenteau et al. |
| 7,777,748 B2 | 8/2010 | Bakalash et al. |
| 7,791,617 B2 | 9/2010 | Crow et al. |
| 7,852,341 B1 | 12/2010 | Rouet et al. |
| 7,869,835 B1 | 1/2011 | Zu |
| 7,957,465 B2 | 6/2011 | Dei et al. |
| 7,965,902 B1 | 6/2011 | Zelinka et al. |
| 8,020,169 B2 | 9/2011 | Yamasaki |
| 8,063,903 B2 | 11/2011 | Vignon et al. |
| 2001/0005209 A1 | 6/2001 | Lindholm et al. |
| 2001/0026647 A1 | 10/2001 | Morita |
| 2001/0028747 A1* | 10/2001 | Sato et al. ............... 382/239 |
| 2001/0031092 A1 | 10/2001 | Zeck et al. |
| 2001/0055336 A1* | 12/2001 | Krause et al. ............ 375/240.11 |
| 2002/0050979 A1 | 5/2002 | Oberoi et al. |
| 2002/0061184 A1* | 5/2002 | Miyamoto ............... 386/68 |
| 2002/0097241 A1 | 7/2002 | McCormack et al. |
| 2002/0114402 A1 | 8/2002 | Doetsch et al. |
| 2002/0116595 A1 | 8/2002 | Morton |
| 2002/0130863 A1 | 9/2002 | Baldwin |
| 2002/0130874 A1 | 9/2002 | Baldwin |
| 2002/0140655 A1 | 10/2002 | Liang et al. |
| 2002/0144061 A1 | 10/2002 | Faanes et al. |
| 2002/0158885 A1 | 10/2002 | Brokenshire et al. |
| 2002/0194430 A1 | 12/2002 | Cho |
| 2002/0196251 A1 | 12/2002 | Duluk, Jr. et al. |
| 2003/0001847 A1 | 1/2003 | Doyle et al. |
| 2003/0003943 A1 | 1/2003 | Bajikar |
| 2003/0014457 A1 | 1/2003 | Desai et al. |
| 2003/0016217 A1 | 1/2003 | Vlachos et al. |
| 2003/0016844 A1 | 1/2003 | Numaoka |
| 2003/0031258 A1 | 2/2003 | Wang et al. |
| 2003/0067468 A1 | 4/2003 | Duluk, Jr. et al. |
| 2003/0067473 A1 | 4/2003 | Taylor et al. |
| 2003/0076325 A1 | 4/2003 | Thrasher |
| 2003/0122815 A1 | 7/2003 | Deering |
| 2003/0163589 A1 | 8/2003 | Bunce et al. |
| 2003/0172326 A1 | 9/2003 | Coffin, III et al. |
| 2003/0188118 A1 | 10/2003 | Jackson |
| 2003/0194116 A1 | 10/2003 | Wong et al. |
| 2003/0201994 A1 | 10/2003 | Taylor et al. |
| 2003/0204673 A1 | 10/2003 | Venkumahanti et al. |
| 2003/0204680 A1 | 10/2003 | Hardage, Jr. |
| 2003/0227461 A1 | 12/2003 | Hux et al. |
| 2003/0228063 A1* | 12/2003 | Nakayama et al. ........... 382/251 |
| 2004/0012597 A1 | 1/2004 | Zatz et al. |
| 2004/0049379 A1 | 3/2004 | Thumpudi et al. |
| 2004/0073771 A1 | 4/2004 | Chen et al. |
| 2004/0073773 A1 | 4/2004 | Demjanenko |
| 2004/0085313 A1 | 5/2004 | Moreton et al. |
| 2004/0103253 A1 | 5/2004 | Kamei et al. |
| 2004/0130552 A1 | 7/2004 | Duluk, Jr. et al. |
| 2004/0183801 A1 | 9/2004 | Deering |
| 2004/0193837 A1 | 9/2004 | Devaney et al. |
| 2004/0196285 A1 | 10/2004 | Rice et al. |
| 2004/0205326 A1 | 10/2004 | Sindagi et al. |
| 2004/0207642 A1 | 10/2004 | Crisu et al. |
| 2004/0212730 A1 | 10/2004 | MacInnis et al. |
| 2004/0215887 A1 | 10/2004 | Starke |

(56) References Cited

U.S. PATENT DOCUMENTS

| | | |
|---|---|---|
| 2004/0221117 A1 | 11/2004 | Shelor |
| 2004/0246251 A1 | 12/2004 | Fenney et al. |
| 2004/0263519 A1 | 12/2004 | Andrews et al. |
| 2005/0002454 A1 | 1/2005 | Ueno et al. |
| 2005/0012759 A1 | 1/2005 | Valmiki et al. |
| 2005/0024369 A1 | 2/2005 | Xie |
| 2005/0030314 A1 | 2/2005 | Dawson |
| 2005/0041037 A1 | 2/2005 | Dawson |
| 2005/0066148 A1 | 3/2005 | Luick |
| 2005/0071722 A1 | 3/2005 | Biles |
| 2005/0088448 A1 | 4/2005 | Hussain et al. |
| 2005/0094729 A1* | 5/2005 | Yuan et al. ............... 375/240.16 |
| 2005/0122338 A1 | 6/2005 | Hong et al. |
| 2005/0123057 A1* | 6/2005 | MacInnis et al. ........ 375/240.25 |
| 2005/0134588 A1 | 6/2005 | Aila et al. |
| 2005/0134603 A1 | 6/2005 | Iourcha et al. |
| 2005/0147166 A1 | 7/2005 | Shibata et al. |
| 2005/0147308 A1 | 7/2005 | Kitamura |
| 2005/0179698 A1 | 8/2005 | Vijayakumar et al. |
| 2005/0239518 A1 | 10/2005 | D'Agostino et al. |
| 2005/0259100 A1 | 11/2005 | Teruyama |
| 2005/0262332 A1 | 11/2005 | Rappoport et al. |
| 2005/0280652 A1 | 12/2005 | Hutchins et al. |
| 2006/0020843 A1 | 1/2006 | Frodsham et al. |
| 2006/0034369 A1 | 2/2006 | Mohsenian |
| 2006/0044317 A1 | 3/2006 | Bourd et al. |
| 2006/0045359 A1 | 3/2006 | Chen et al. |
| 2006/0064517 A1 | 3/2006 | Oliver |
| 2006/0064547 A1 | 3/2006 | Kottapalli et al. |
| 2006/0103659 A1 | 5/2006 | Karandikar et al. |
| 2006/0152519 A1 | 7/2006 | Hutchins et al. |
| 2006/0152520 A1 | 7/2006 | Gadre et al. |
| 2006/0170690 A1 | 8/2006 | Leather |
| 2006/0176308 A1 | 8/2006 | Karandikar et al. |
| 2006/0176309 A1 | 8/2006 | Gadre et al. |
| 2006/0203005 A1 | 9/2006 | Hunter |
| 2006/0245001 A1 | 11/2006 | Lee et al. |
| 2006/0267981 A1 | 11/2006 | Naoi |
| 2007/0002946 A1* | 1/2007 | Bouton et al. ........... 375/240.01 |
| 2007/0025441 A1* | 2/2007 | Ugur et al. ............... 375/240.03 |
| 2007/0076010 A1 | 4/2007 | Swamy et al. |
| 2007/0130444 A1 | 6/2007 | Mitu et al. |
| 2007/0139440 A1 | 6/2007 | Crow et al. |
| 2007/0153907 A1 | 7/2007 | Mehta et al. |
| 2007/0253491 A1* | 11/2007 | Ito et al. .................... 375/240.24 |
| 2007/0268298 A1 | 11/2007 | Alben et al. |
| 2007/0273689 A1 | 11/2007 | Tsao |
| 2007/0285427 A1 | 12/2007 | Morein et al. |
| 2007/0286280 A1* | 12/2007 | Saigo et al. ............. 375/240.12 |
| 2007/0286289 A1 | 12/2007 | Arai et al. |
| 2007/0296725 A1 | 12/2007 | Steiner et al. |
| 2008/0016327 A1 | 1/2008 | Menon et al. |
| 2008/0024497 A1 | 1/2008 | Crow et al. |
| 2008/0024522 A1 | 1/2008 | Crow et al. |
| 2008/0100618 A1 | 5/2008 | Woo et al. |
| 2008/0181522 A1* | 7/2008 | Hosaka et al. ................ 382/251 |
| 2008/0226187 A1* | 9/2008 | Sato .............................. 382/244 |
| 2008/0273218 A1 | 11/2008 | Kitora et al. |
| 2008/0278509 A1 | 11/2008 | Washizu et al. |
| 2009/0102686 A1* | 4/2009 | Fukuhara et al. ............... 341/67 |
| 2009/0154557 A1* | 6/2009 | Zhao et al. ............... 375/240.03 |
| 2009/0168899 A1 | 7/2009 | Schlanger et al. |
| 2009/0235051 A1 | 9/2009 | Codrescu et al. |
| 2012/0023149 A1 | 1/2012 | Kinsman et al. |

FOREIGN PATENT DOCUMENTS

| | | |
|---|---|---|
| JP | 06-180758 | 6/1994 |
| JP | 07-101885 | 4/1995 |
| JP | H0877347 | 3/1996 |
| JP | 08-153032 | 6/1996 |
| JP | 09-287217 | 11/1997 |
| JP | H09325759 | 12/1997 |
| JP | 10-134198 | 5/1998 |
| JP | 11-190447 | 7/1999 |
| JP | 11-195132 | 7/1999 |
| JP | 2000148695 | 5/2000 |
| JP | 2003-178294 | 6/2000 |
| JP | 2005-182547 | 7/2005 |
| KR | 100262453 | 8/2000 |
| TW | 413766 | 12/2000 |
| TW | 436710 | 5/2001 |
| TW | 442734 | 6/2001 |
| WO | 0013145 | 3/2000 |

OTHER PUBLICATIONS

"Anti-aliasing"; http://en.wikipedia.org/wiki/Anti-aliasing; Mar. 27, 2006.

"Vertex Fog"; http://msdn.microsoft.com/library/en-us/directx9_cVertex_fog.asp?frame=true Mar. 27, 2006.

A Hardware Assisted Design Rule Check Architecture Larry Seller Jan. 1982 Proceedings of the 19th Conference on Design Automation DAC '82 Publisher: IEEE Press.

A Parallel Alogorithm for Polygon Rasterization Juan Pineda Jun. 1988 ACM.

A VLSI Architecture for Updating Raster-Scan Displays Satish Gupta, Robert F. Sproull, Ivan E. Sutherland Aug. 1981 ACM SIGGRAPH Computer Graphics, Proceedings of the 8th Annual Conference on Computer Graphics and Interactive Techniques SIGGRAPH '81, vol. 15 Issue Publisher: ACM Press.

Blythe, OpenGL section 3.4.1, Basic Line Segment Rasterization, Mar. 29, 1997, pp. 1-3.

Boyer, et al.; "Discrete Analysis for Antialiased Lines," Eurographics 2000; 3 Pages.

Brown, Brian; "Data Structure And Number Systems"; 2000; http://www.ibilce.unesp.br/courseware/datas/data3.htm.

Crow; "The Use of Grayscale for Improves Raster Display of Vectors and Characters;" University of Texas, Austin, Texas; Work supported by the National Science Foundation unser Grants MCS 76-83889; pp. 1-5: ACM Press, 1978.

Definition of "block" from FOLDOC, http://foldoc.org/index.cgi?block, Sep. 23, 2004.

Definition of "first-in first-out" from FOLDOC, http://foldoc.org/index.cgi?query=fifo&action=Search, Dec. 6, 1999.

Definition of "queue" from Free on-Line Dictionary of Computing (FOLDOC), http://foldoc.org/index.cgi?query=queue&action=Search, May 15, 2007.

Definition of "Slot," http://www.thefreedictionary.com/slot, Oct. 2, 2012.

Dictionary of Computers, Information Processing & Technology, 2nd Edition, 1984.

Duca et al., A Relational Debugging Engine for Graphics Pipeline, International Conference on Computer Graphics and Interactive Techniques, ACM SIGGRAPH 2005, pp. 453-463, ISSN: 0730-0301.

Fisher, Joseph A., Very Long Instruction Word Architecture and the ELI-512, ACM, 1993, pp. 140-150.

FOLDOC (Free On-Line Dictionary of Computing), definition of X86, Feb. 27, 2004.

FOLDOC, definition of "frame buffer", from foldoc.org/index.cgi?query=frame+buffer&action=Search, Oct. 3, 1997.

FOLDOC, definition of "motherboard", from foldoc.org/index.cgi?query=motherboard&action=Search, Aug. 10, 2000.

FOLDOC, definition of "separate compilation", from foldoc.org/index.cgi?query=separate+compilation&action=Search, Feb. 19, 2005.

FOLDOC, definition of "superscalar", http://foldoc.org/, Jun. 22, 2009.

FOLDOC, definition of "vector processor", http://foldoc.org/, Sep. 11, 2003.

FOLDOC, definition of Pentium, Sep. 30, 2003.

FOLDOC, Free Online Dictionary of Computing, definition of SIMD, foldoc.org/index.cgi?query=simd&action=Search, Nov. 4, 1994.

Foley, J. "Computer Graphics: Principles and Practice", 1987, Addison-Wesley Publishing, 2nd Edition, p. 545-546.

(56) References Cited

OTHER PUBLICATIONS

Free On-Line Dictionary of Computing (FOLDOC), definition of "video", from foldoc.org/index.cgi?query=video&action=Search, May 23, 2008.

Fuchs; "Fast Spheres Shadow, Textures, Transparencies, and Image Enhancements in Pixel-Planes"; ACM; 1985; Department of Computer Science, University of North Carolina at Chapel Hill, Chapel Hill, NC 27514.

Gadre, S., Patent Application Entitled "Separately Schedulable Condition Codes for a Video Processor", U.S. Appl. No. 11/267,793, filed Nov. 4, 2005.

Gadre, S., Patent Application Entitled "Stream Processing in a Video Processor", U.S. Appl. No. 11/267,599, filed Nov. 4, 2005.

Gadre, S., Patent Application Entitled "Video Processor Having Scalar and Vector Components With Command FIFO for Passing Function Calls From Scalar to Vector", U.S. Appl. No. 11/267,700, filed Nov. 4, 2005.

gDEBugger, graphicRemedy, http://www.gremedy.com, Aug. 8, 2006.

Graf, Rudolf F., Modern Dictionary of Electronics, Howard W. Sams & Company, 1984, pp. 566.

Graf, Rudolf F., Modern Dictionary of Electronics, Howard W. Sams & Company, 1988, pp. 273.

Graham, Susan L. et al., Getting Up to Speed: The future of Supercomputing, the National Academies Press, 2005, glossary.

Graston et al. (Software Pipelining Irregular Loops On the TMS320C6000 VLIW DSP Architecture); Proceedings of the ACM SIGPLAN workshop on Languages, compilers and tools for embedded systems; pp. 138-144; Year of Publication: 2001.

Hamacher, V. Carl et l., Computer Organization, Second Edition, McGraw Hill, 1984, pp. 1-9.

Heirich; Optimal Automatic Multi-pass Shader Partitioning by Dynamic Programming; Eurographics-Graphics Hardware (2005); Jul. 2005.

HPL-PD A Parameterized Research Approach—May 31, 2004 http://web.archive.org/web/*/www.trimaran.org/docs/5_hpl-pd.pdf.

Hutchins E., SC10: A Video Processor and Pixel-Shading GPU for Handheld Devices; presented at the Hot Chips conferences on Aug. 23, 2004.

IBM TDB, Device Queue Management, vol. 31 Iss. 10, pp. 45-50, Mar. 1, 1989.

Intel, Intel Architecture Software Developer's Manual, vol. 1: Basic Architecture 1997 p. 8-1.

Intel, Intel Architecture Software Developer's Manual, vol. 1: Basic Architecture 1999 p. 8-1, 9-1.

Intel, Intel MMX Technology at a Glance, Jun. 1997.

Intel, Intel Pentium III Xeon Processor at 500 and 550 Mhz, Feb. 1999.

Intel, Pentium Processor Family Developer's Manual, 1997, pp. 2-13.

Intel, Pentium processor with MMX Technology at 233Mhz Performance Brief, Jan. 1998, pp. 3 and 8.

Rosenberg, Jerry M., Dictionary of Computers, Information Processing & Telecommunications, 2nd Edition, John Wiley & Sons, 1987, pp. 102 and 338.

Merriam-Webster Dictionary Online; Definition for "program"; retrieved Dec. 14, 2010.

Rosenberg, Jerry M., Dictionary of Computers, Information Processing & Telecommunications, 2nd Edition, John Wiley & Sons, 1987, pp. 305.

Woods J., Nvidia GeForce FX Preview, at http://www.tweak3d.net/reviews/nvidia/nv30preview/1.shtml; dated 11/18/202; retrieved Jun. 16, 2011.

Wilson D., Nvidia's Tiny 90nm G71 and G73: GeForce 7900 Debut; at http://www.anantech.com/show/1967/2; dated Sep. 3, 2006, retrieved Jun. 16, 2011.

NVIDIA Corporation, Technical Brief: Transform and Lighting; dated 1999; month unknown.

Parhami, Behrooz, Computer Arithmetic: Algorithms and Hardware Designs, Oxford University Press, Jun. 2000, pp. 413-418.

Pcreview, article entitled "What is a Motherboard", from www.pcreview.co.uk/articles/Hardware/What_is_a_Motherboard., Nov. 22, 2005.

Quinnell, Richard A. "New DSP Architectures Go "Post-Harvard" for Higher Performance and Flexibility" Techonline; posted May 1, 2002.

SearchStorage.com Definitions, "Pipelining Burst Cache," Jul. 31, 2001, url: http://searchstorage.techtarget.com/sDefinition/0,,sid5_gci214414,00.html.

Wikipedia, definition of "scalar processor", Apr. 4, 2009.

Wikipedia, entry page defining term "SIMD", last modified Mar. 17, 2007.

Wikipedia, definition of Multiplication, accessed from en.wikipedia.org/w/index.php?title=Multiplication&oldid=1890974, published Oct. 13, 2003.

Wikipedia, definition of "subroutine", published Nov. 29, 2003, four pages.

Wikipedia, definition of "vector processor", http://en.wikipedia.org/, May 14, 2007.

\* cited by examiner

Encoder 300

Flowchart 400

Encoder 500

REWIND-ENABLED HARDWARE ENCODER

FIELD OF THE INVENTION

The present invention is generally related to encoding digital video data.

BACKGROUND

The continuing spread of digital media has led to a proliferation of video encoding standards, such as MPEG-4, H.263, H.264, DIVX, and XVID. These video standards attempt to balance compression of raw data and quality of video playback. Most video compression techniques use temporal and spatial prediction to compress raw video streams. However, each of the standards calls for different specific operations.

In addition to the proliferation of competing video standards, more devices are being marketed which include video encoding or decoding functionality. The manufacturers of these devices must decide which video standards to support, which requires balancing the costs associated with supporting a given video standard against the value added by supporting that standard.

Typically, support for a video standard can be implemented one of two ways. Either support is provided via software, or via a specialized hardware. Software implementations require that the processor in the device perform all of the encoding or decoding operations, which can be a computationally expensive task, and often cannot be performed in real-time by a general-purpose processor. Hardware implementations typically require a completely separate encoder for each video standard supported, with the associated expenses of developing, manufacturing, and powering the related hardware.

SUMMARY

Described herein are a number of approaches for implementing a video encoder with hardware-enabled rewind functionality. In several embodiments, rewind functionality can be implemented in hardware, in a manner which allows the transform engine of the encoder to reprocess video data, without requesting data from other stages in the encoder. Such rewind functionality is useful in implementing some video standards in a pipeline architecture, such as the H.264 standard. In one embodiment, a method of encoding video data is described, which involves obtaining a first portion of video data from a first location in a buffer, and performing an encoding operation on it. The second portion of video data is obtained from a second location in the buffer, and encoding operations begin on the second portion. The first portion of video data can be retrieved from the first location, in order to reprocess the first portion if necessary.

Another embodiment describes a system for encoding video data, which includes a transform buffer for storing processed macroblocks, a transform engine for transforming the processed macroblocks into quantized macroblocks, and a rewind control module for causing the transform engine to reprocess one of the processed macroblocks.

A further embodiment describes a handheld computer system device, which includes a system memory, a central processing unit (CPU), and a graphics processing unit (GPU). The GPU includes an encoder for encoding video data, which is configured to obtain a first portion of video data from a first location in a buffer, and perform an encoding operation on it the encoder is further configured to obtain a second portion of video data from a second location in the buffer, and begin performing encoding operations on it. The encoder is also configured to retrieve the first portion of video data from the first location in the buffer, in order to reprocess the first portion of video data, as needed.

BRIEF DESCRIPTION OF THE DRAWINGS

The present invention is illustrated by way of example, and not by way of limitation, in the Figures of the accompanying drawings and in which like reference numerals refer to similar elements.

DETAILED DESCRIPTION

Figure 1:
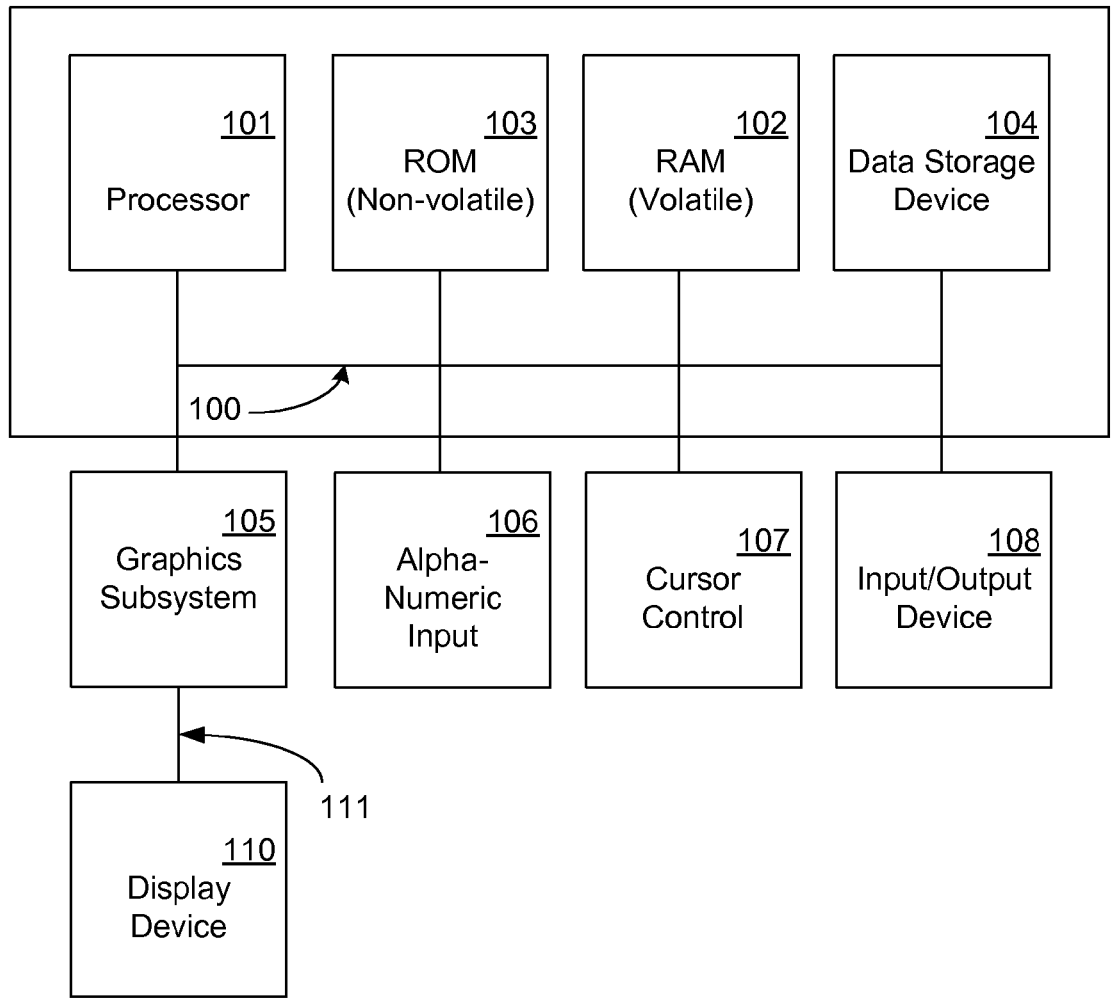
FIG. 1 depicts a block diagram of a computer system in accordance with one embodiment of the present invention.

Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in figures herein (e.g., FIG. 3) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Although embodiments described herein may make reference to a CPU and a GPU as discrete components of a computer system, those skilled in the art will recognize that a CPU and a GPU can be integrated into a single device, and a CPU and GPU may share various resources such as instruction logic, buffers, functional units and so on; or separate resources may be provided for graphics and general-purpose operations. Accordingly, any or all of the circuits and/or functionality described herein as being associated with GPU could also be implemented in and performed by a suitably configured CPU.

Further, while embodiments described herein may make reference to a GPU, it is to be understood that the circuits and/or functionality described herein could also be implemented in other types of processors, such as general-purpose or other special-purpose coprocessors, or within a CPU.

Basic Computing System

Referring now to FIG. 1, a block diagram of an exemplary computer system 112 is shown. It is appreciated that computer system 112 described herein illustrates an exemplary configuration of an operational platform upon which embodiments may be implemented to advantage. Nevertheless, other computer systems with differing configurations can also be used in place of computer system 112 within the scope of the present invention. That is, computer system 112 can include elements other than those described in conjunction with FIG. 1. Moreover, embodiments may be practiced on any system which can be configured to enable it, not just computer systems like computer system 112. It is understood that embodiments can be practiced on many different types of computer system 112. System 112 can be implemented as, for example, a desktop computer system or server computer system having a powerful general-purpose CPU coupled to a dedicated graphics rendering GPU. In such an embodiment, components can be included that add peripheral buses, specialized audio/video components, IO devices, and the like. Similarly, system 112 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan. System 112 can also be implemented as a "system on a chip", where the electronics (e.g., the components 101, 103, 105, 106, and the like) of a computing device are wholly contained within a single integrated circuit die. Examples include a hand-held instrument with a display, a car navigation system, a portable entertainment system, and the like.

Computer system 112 comprises an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Moreover, computer system 112 also comprises a data storage device 104 (e.g., hard disk drive) for storing information and instructions.

Computer system 112 also comprises an optional graphics subsystem 105, an optional alphanumeric input device 106, an optional cursor control or directing device 107, and signal communication interface (input/output device) 108. Optional alphanumeric input device 106 can communicate information and command selections to central processor 101. Optional cursor control or directing device 107 is coupled to bus 100 for communicating user input information and command selections to central processor 101. Signal communication interface (input/output device) 108, which is also coupled to bus 100, can be a serial port. Communication interface 108 may also include wireless communication mechanisms. Using communication interface 108, computer system 112 can be communicatively coupled to other computer systems over a communication network such as the Internet or an intranet (e.g., a local area network), or can receive data (e.g., a digital television signal). Computer system 112 may also comprise graphics subsystem 105 for presenting information to the computer user, e.g., by displaying information on an attached display device 110, connected by a video cable 111. In some embodiments, graphics subsystem 105 is incorporated into central processor 101. In other embodiments, graphics subsystem 105 is a separate, discrete component. In other embodiments, graphics subsystem 105 is incorporated into another component. In other embodiments, graphics subsystem 105 is included in system 112 in other ways.

Multistandard Video Encoder

The embodiments detailed herein describe a multistandard encoder, where expensive redundant elements can be shared across different video standards. In some embodiments, for example, buffers between stages in the encoding pipeline can be used regardless of the video standard being used, while standard-specific hardware data paths are used to perform the necessary manipulation of the data stored in these buffers. In this way, these embodiments eliminate the need to duplicate the expensive buffers across separate hardware encoders for each supported video standard. Embodiments utilizing this approach require fewer hardware elements to implement, are more modular in design such that support for a given standard is easier to add or remove, and require less power than the traditional approach of completely separate hardware encoders for every video standard.

Moreover, some of the embodiments described herein describe a rewind-enabled hardware encoder. Several modern video standards, such as H.264, describe a "rewind" functionality, where data can be reprocessed under a number of different circumstances. In these embodiments, multiple buffers are used to store data after it has been processed by the transform engine in an encoder, in order to allow the data to be easily reprocessed.

One embodiment described herein combines the functionality detailed above, to create a multistandard encoder which supports hardware rewind. This embodiment offers the advantages of multistandard hardware video encoding, in combination with the processing time advantage of hardware-enabled rewind, to support the goal of real-time encoding.

Encoder Architecture

Figure 2:
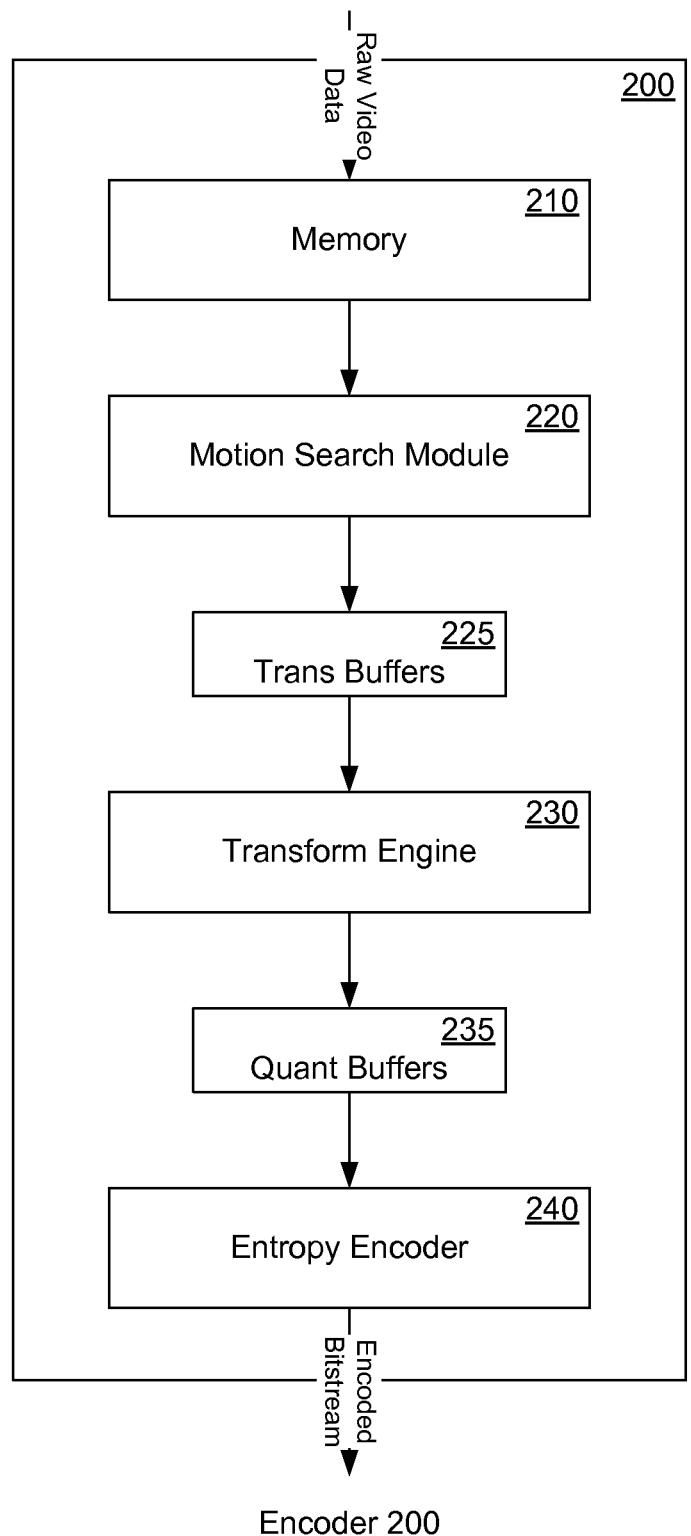
FIG. 2 depicts a block diagram of a video encoder, in accordance with one embodiment.

With reference now to FIG. 2, a block diagram of encoder 200 is depicted, in accordance with one embodiment of the present invention. While encoder 200 is shown as incorporating specific, enumerated features, elements, and arrangements, it is understood that embodiments are well suited to applications involving additional, fewer, or different features, elements, or arrangements.

Encoder 200, in the depicted embodiment, is representative of a typical hardware encoder for a video standard using temporal and spatial prediction to compress raw video streams. Raw video data is placed in memory 210. Motion search module 220 retrieves the raw video data and processes it, often in macroblocks of 16×16 pixels. Each processed macroblock is loaded into transform buffer 225. Transform engine 230 retrieves the processed macroblock from transform buffer 225, performs additional operations, and outputs data to quantization buffer 235. Entropy encoder 240 takes the data from quantization buffer 235, and outputs an encoded bitstream.

Buffers, such as transform buffer 225 and quantization buffer 235, are used in encoding to increase hardware efficiency. Buffers allow the various encoding stages to work simultaneously and relatively independent of the other stages. For example, rather than requiring motion search module 220 to wait for transform engine 230 to complete operations, motion search module 220 loads a completed macroblock into transform buffer 225, and begins processing the next macroblock.

Multistandard Encoder with Shared Buffers

Figure 3:
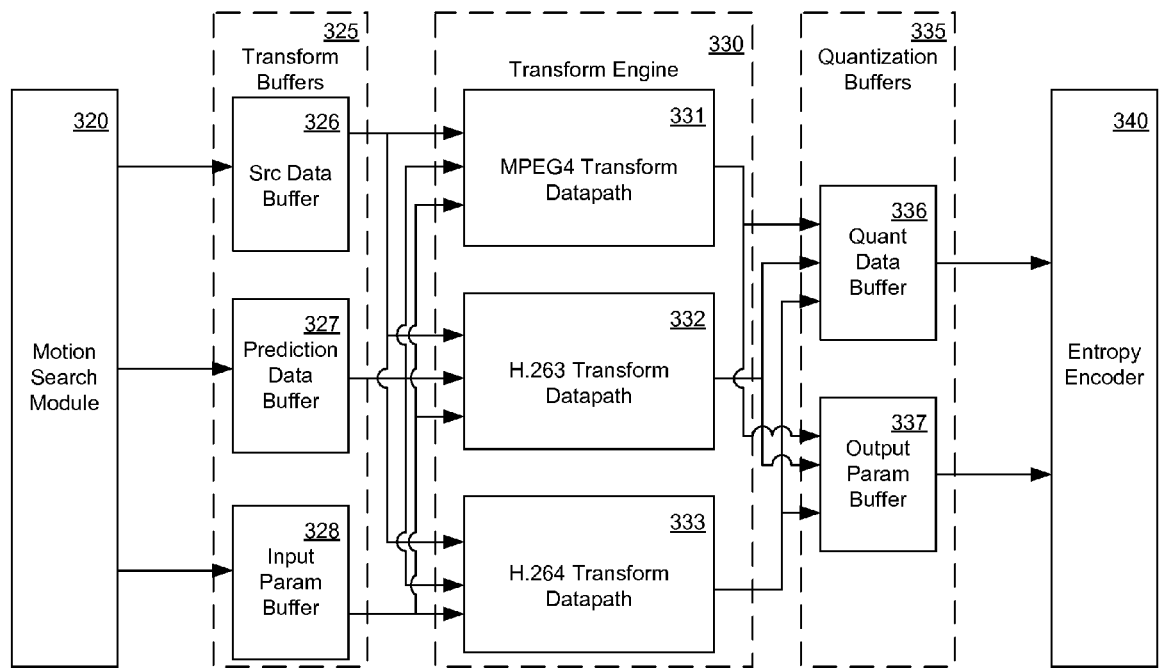
FIG. 3 depicts a block diagram of a multistandard video encoder, in accordance with one embodiment.

With reference now to FIG. 3, a block diagram of multistandard encoder 300 is depicted, in accordance with one embodiment. While encoder 300 is shown as incorporating specific, enumerated features, elements, and arrangements, it is understood that embodiments are well suited to applications involving additional, fewer, or different features, elements, or arrangements.

The depicted embodiment shows a portion of a multistandard encoder, to illustrate the approach used therein. As with encoder 200, motion search module 320 processes macroblocks, and outputs them to transform buffers 325. Transform engine 330 retrieves the macro blocks from transform buffers 325, processes them, and outputs quantized macroblock data to quantization buffers 335. Entropy encoder 340 retrieves the quantized macroblock data, and uses it to produce an encoded bitstream.

In this embodiment, transform buffers 325 include source data buffer 326, prediction data buffer 327, and input parameter buffer 320. Motion search module 320, in this embodiment, populates these buffers. Source data buffer 326 stores raw video pixels of the current macroblock. Prediction data buffer 327 stores predicted video pixels for the current macroblock by motion search module, which transform engine 330 will use when processing macroblock information from source data buffer 326. Input parameter buffer 328 stores parameters of the current macroblock such as motion vectors, quantization parameters, etc., which are used by transform engine 330 in determining how to process macroblock information, e.g., what bit rate the video should be encoded at.

In this embodiment, quantization buffers 335 include quantization data buffer 336, and output parameter buffer 337. Quantization data buffer 336 is used to store quantized macroblock pixels or coefficients produced by transform engine 330, and used by entropy encoder 340. Output parameter buffer 337 is used to pass encoding parameters to entropy encoder 340, for use in processing the quantized macroblock information.

In the depicted embodiment, transform engine 330 includes a number of standard-specific datapaths, e.g., MPEG-4 transform datapaths 331, H.263 transform datapath 332, and H.264 transform datapath 333. In different embodiments, different, fewer, or additional video standards may be supported by inclusion of different, fewer, or additional hardware datapaths.

Under this approach, buffers can be shared between different hardware datapaths, e.g., both the MPEG-4 and H.264 transform datapaths can read from the same set of transform buffers 325, and write to the same set of quantization buffers 335. In some embodiments, the encoder can be instructed, e.g., by driver software executing on a processor, as to which video standard to use when encoding the raw video data. This instruction, in turn, will determine which transform datapath is used by transform engine 330 when encoding data. Similarly, motion search module 320 and/or entropy encoder 340 may include several hardware datapaths, in order to support and select between multiple video standards.

Method of Video Encoding

Figure 4:
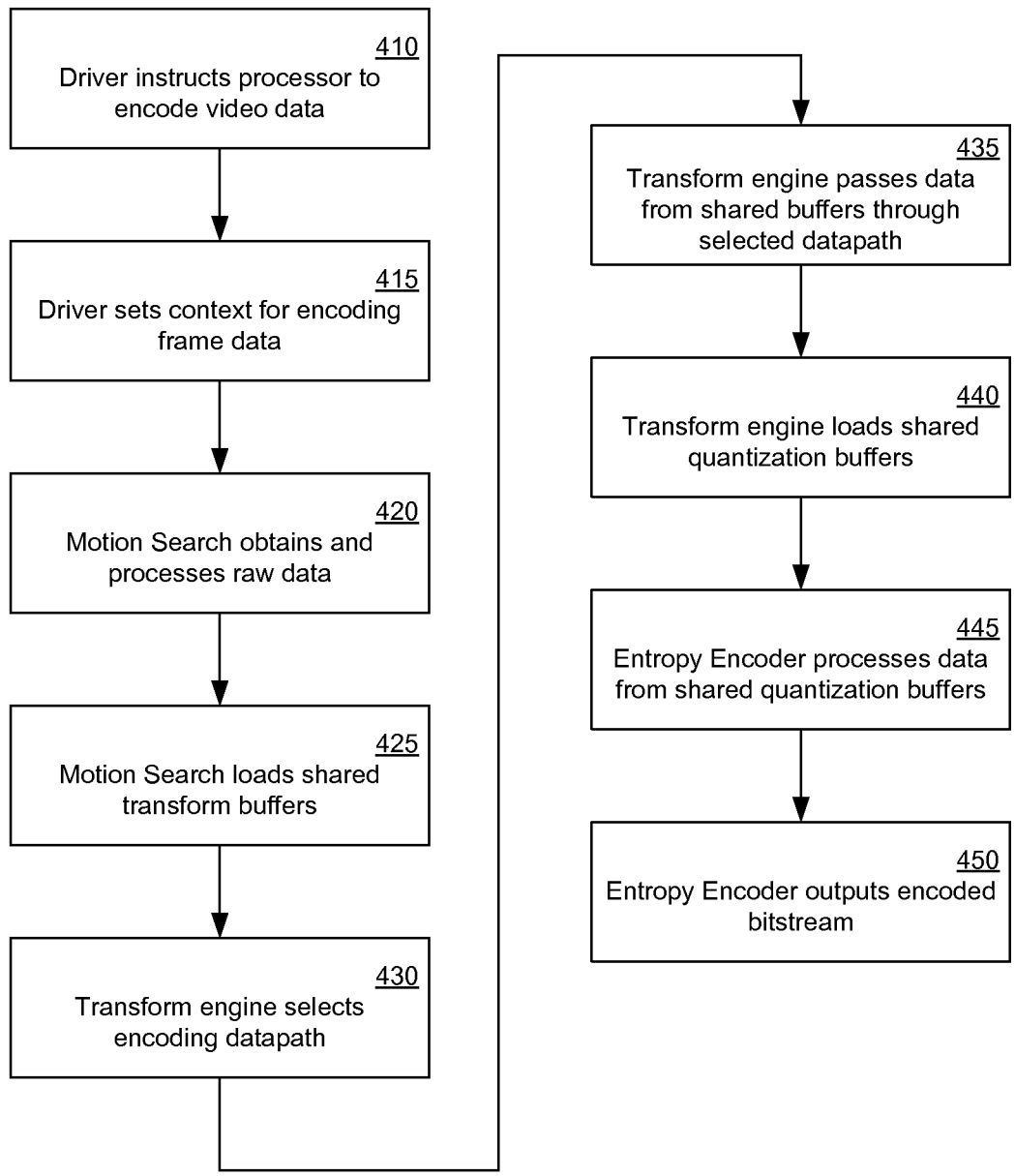
FIG. 4 depicts a flowchart of a method of video encoding, in accordance with one embodiment.

With reference now to FIG. 4, a flowchart 400 of a method of video encoding is depicted, in accordance with one embodiment. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed.

With reference to step 410, a driver instructs a processor to encode video data. In some embodiments, a graphics processor or GPU is utilized, incorporating an encoder such as that described in FIG. 3; in other embodiments, other implementations are utilized. The encoder is instructed to encode video data, e.g., by driver software executing on a processor.

With reference now to step 415, the driver provides a context for encoding video frame data. In some embodiments, as previously discussed, the encoder may be capable of encoding video data in accordance with a number of different video encoding standards. In one such embodiment, the driver software instructs the encoder as to which video standard to use in encoding the video data. In one such embodiment, the encoder supports changing the encoding standard on a frame-by-frame basis.

With reference now to step 420, a motion search module obtains and processes raw video data. In some embodiments, a motion search module performs some encoding tasks. In several such embodiments, the motion search module may be configured to perform a different tasks, depending upon the video standard specified in step 415.

With reference now to step 425, a motion search module loads processed video data into shared transform buffers. In these embodiments, a single set of transform buffers are shared by a number of different encoding data paths. Regardless of which video standard is specified, the motion search module outputs processed video data to the same shared transform buffers.

For example, with reference to FIG. 3, motion search module 320 obtains raw video data from memory, and performs tasks related to encoding the raw video data. Motion search module 320 outputs processed macroblocks to transform buffers 325.

With reference now to step 430, a transform engine selects an appropriate transform datapath. As discussed previously, several embodiments incorporate hardware support for multiple video encoding standards, and include multiple hardware datapaths in the encoder. Depending upon the video standard specified in step 415, an appropriate hardware transform datapath may be selected. Moreover, in some embodiments, software encoding may be supported for several video standards; in such an embodiment, software instructions executing on a processor may be utilized during the encoding process. These embodiments allow for expandability in supported video encoding standards, particularly for standards which are computationally less demanding.

With reference now to step 435, the transfer engine passes data from the shared transform buffers through the selected datapath. In different embodiments, and depending upon the selected video standard, different operations may be performed by the selected transform datapath.

With reference now to step 440, the transform engine loads the output from the transform datapath into shared quantization buffers. In some embodiments, the output from a the transform datapath consists of quantized macroblock information, e.g., quantized coefficients. This quantized macroblock information can be loaded into shared quantization buffers.

Continuing the preceding example, transform engine 330 selects the appropriate transform datapath for the desired video standard, e.g., MPEG4 transform datapath 331 is used if the video is to be encoded using the MPEG-4 standard, or H.264 transform datapath 333 may be selected for H.264 video encoding. The selected transform datapath is connected to source data buffer 326, prediction data buffer 327, and input parameter buffer 328. The data is processed in accordance with the selected video standard, and output to quantization data buffer 336 and output parameter buffer 337.

With reference now to step 445, an entropy encoder processes data from the shared quantization buffers. In some embodiments, an entropy encoder is used to further process video data during the encoding process. The operations performed by the entropy encoder may vary, depending upon the embodiment and the selected video standard. As with the motion search module in the transform engine, the entropy encoder may include multiple hardware datapaths, to support multiple video standards. Also as with the motion search module and the transform engine, the entropy encoder may use software instructions executing a processor to support a video encoding standard. The shared quantization buffers are accessible to the various datapaths included in the entropy encoder.

With reference now to step 450, the entropy encoder outputs an encoded bit stream. In some embodiments, the entropy encoder outputs a packetized bit stream, which may be written to memory, to a buffer, and/or output to a display.

Hardware-Enabled Rewind Functionality

Figure 5:
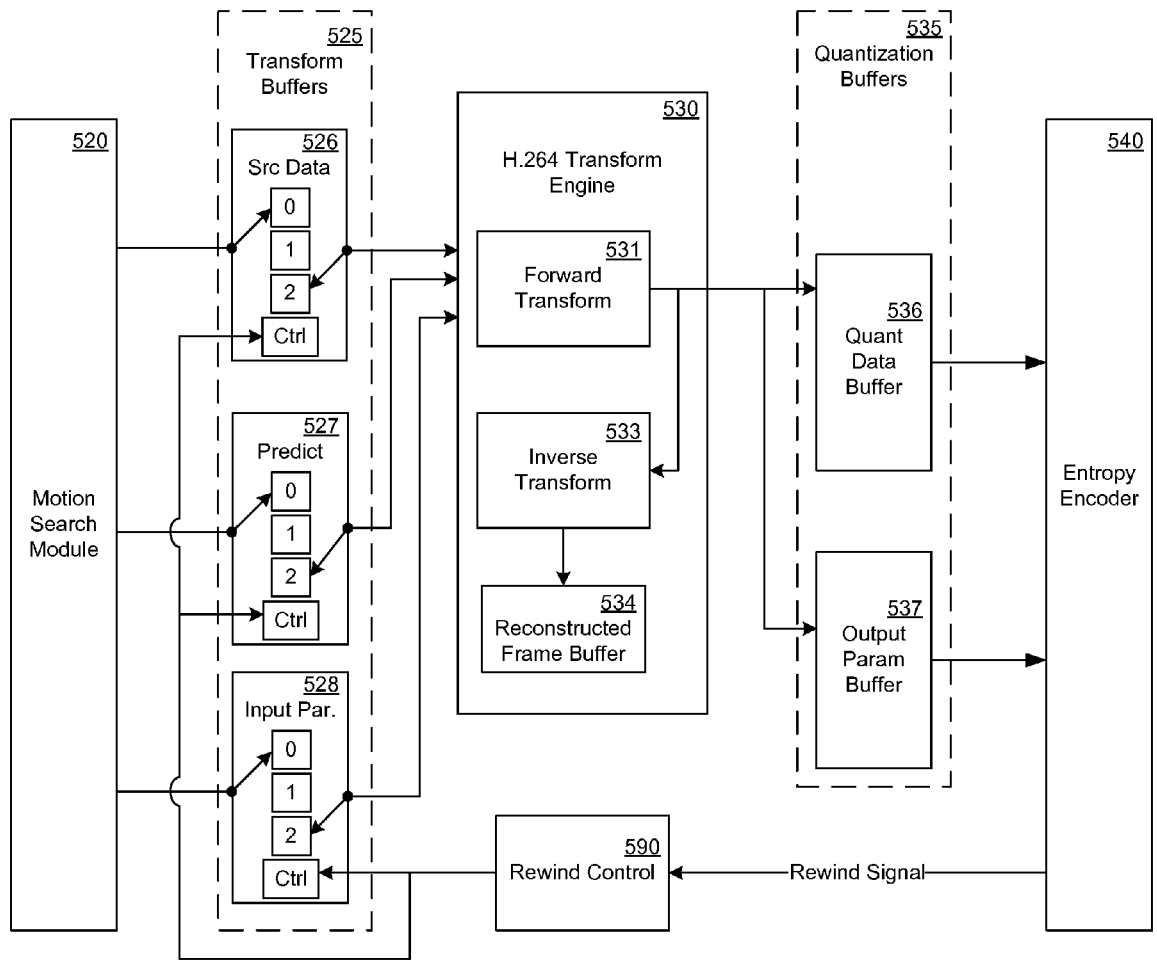
FIG. 5 depicts a block diagram of an encoder with hardware-enabled rewind functionality, in accordance with one embodiment.

With reference now FIG. 5, a block diagram of an encoder 500 is depicted, in accordance with one embodiment. Encoder 500 provides hardware support for a rewind operation, as specified in a number of video standards, including the H.264 standard. While encoder 500 is shown as incorporating specific, enumerated features, elements, and arrangements, it is understood that embodiments are well suited to applications involving additional, fewer, or different features, elements, or arrangements.

As with FIG. 3, FIG. 5 depicts a portion of an encoder, such as may be incorporated into a graphics processor. As in encoders 200 and 300, motion search module 520 processes macroblocks, and outputs them to transform buffers 525. In the depicted embodiment, the various transform buffers 525, such as search data buffer 526, prediction data buffer 527, and input parameter buffer 528, can store data associated with multiple macroblocks; in the depicted embodiment, each of these buffers can store three macroblocks' worth of data. In this embodiment, these additional buffers can be used to retain data associated with a previously processed macroblock. As such, when H.264 transform engine 530 is processing macroblock n, data associated with macroblock n−1 is still stored in the transform buffers, while motion search module 520 is writing data associated with macroblock n+1 into the transform buffers. This allows support for macroblock rewind, which can aid in implementing the H.264 video standard in a macroblock processing pipeline, in such a way that the transform engine can perform the rewind function without requesting data from the motion search module.

Transform engine 530 is shown as incorporating forward transform module 531, inverse transform module 533, and reconstructed frame buffer 534. For the H.264 standard, as with a number of other video standards, the operations performed by this collection of modules are standardized, though the organization and naming of modules may vary across different embodiments. Forward transform module 531 loads data into quantization buffers 535, where entropy encoder 540 can retrieve it.

In order to implement some video standards, such as H.264, in a macroblock pipeline architecture, rewind functionality is utilized, such that the entropy encoder can reject a processed macroblock. Such rejection typically occurs for one of two reasons. If the processed macroblock data, as produced by the transform data path, is larger than the unprocessed macroblock data, the entropy encoder will report an IPCM error. If the processed macroblock data does not fit in the current video data packet, the entropy encoder will return a bit-based error. If both of these conditions occur, the entropy encoder will report both errors.

Depending upon the configuration of the encoder, as well as the video standard being utilized, the transform engine may react in a number of different ways to these errors. In one embodiment, the transform engine will respond to an IPCM error by sending the unprocessed video data instead, rather than passing the data through the forward transform module. In another embodiment, the transform engine may reprocess the data, using a different set of parameters, to attempt to produce acceptable processed macroblock data. In some embodiments, the transform engine responds to a bit-based error by reprocessing the data for the rejected macroblock. In one embodiment, the transform engine responds to the combination of an IPCM error and a bit-based error by responding as per an IPCM error.

Encoder 500, in the depicted embodiment, includes rewind control module 590. Rewind control module 590 receives the rewind signal from entropy encoder 540. In some embodiments, entropy encoder 540 outputs a rewind signal for every macroblock processed; in other embodiments, entropy encoder 540 might only output a rewind signal when a macroblock is rejected. In the case of a rewind condition occurring, rewind control module 590 utilizes the control functionality present in each of the transform buffers 525, to alter which buffers transform engine 530 is accessing, e.g., by selecting the buffers corresponding to the rejected macroblock.

In some embodiments, the rewind signal is also passed to driver software (not pictured) which controls encoder 500. In one such embodiment, the driver software instructs the transform engine to stop processing its current macroblock, and to process the macroblock in the currently-designated buffers, e.g., the buffers associated with the rejected macroblock. For example, if macroblock n–1 was rejected by entropy encoder 540, the driver would instruct the transform engine to stop processing macroblock n. Rewind control 590 would alter the pointers for transform buffers 525 to point to the buffers containing data for macroblock n–1, and the driver software would instruct H.264 transform engine 530 to reprocess the data. If only a bit-based error was reported by entropy encoder 540, the macroblock would be reprocessed with the original parameters. If an IPCM error was reported, the unprocessed macroblock data would be written to quantization buffers 535.

Method of Rewind-Enabled Encoding

Figure 6:
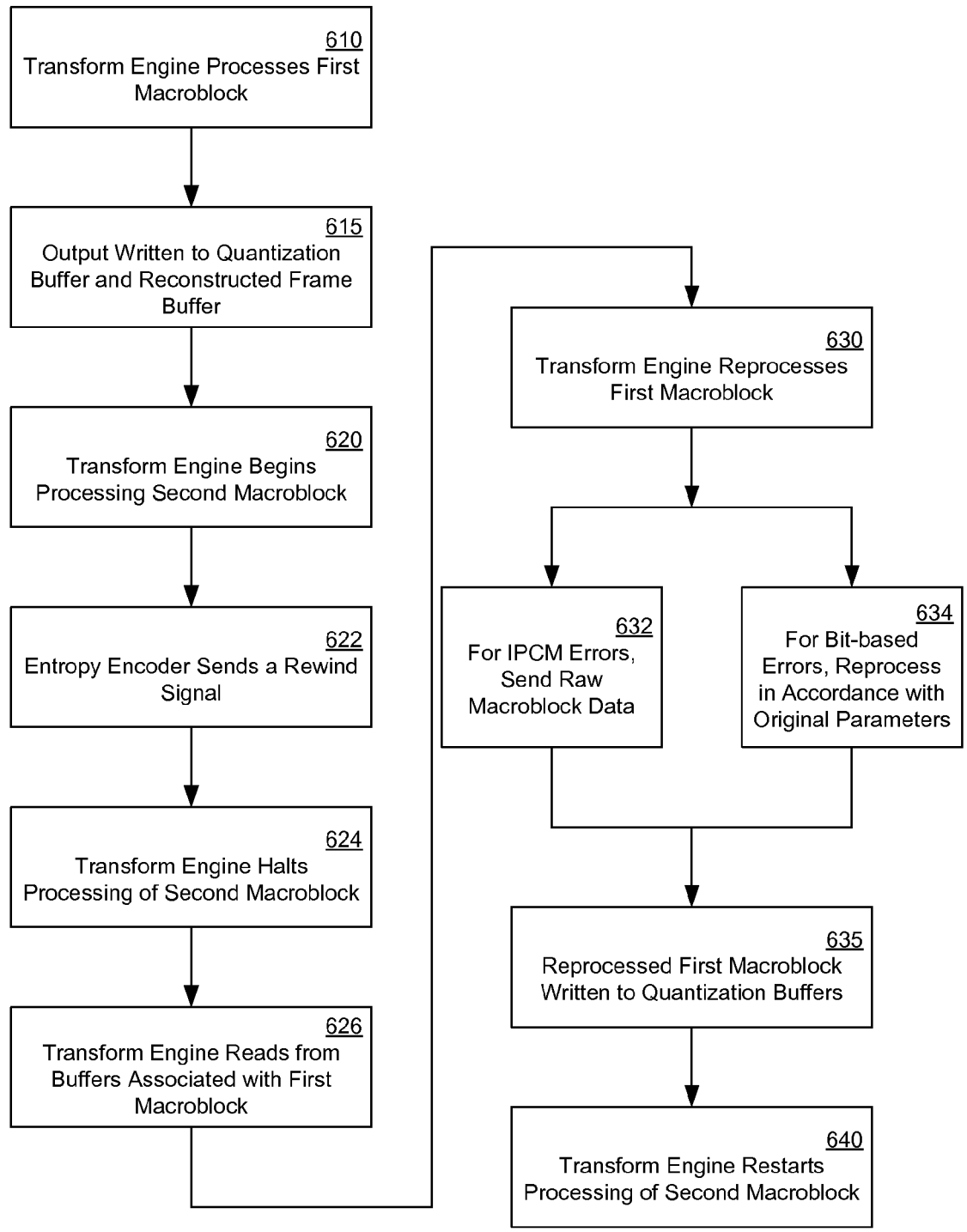
FIG. 6 depicts a flowchart of a method of rewind-enabled hardware encoding, in accordance with one embodiment.

With reference now to FIG. 6, a flowchart 600 of a method of rewind-enabled hardware encoding is depicted, in accordance with one embodiment. Although specific steps are disclosed in flowchart 600, such steps are exemplary. That is, embodiments of the present invention are well suited to performing various other (additional) steps or variations of the steps recited in flowchart 600. It is appreciated that the steps in flowchart 600 may be performed in an order different than presented, and that not all of the steps in flowchart 600 may be performed.

With reference to step 610, a transform engine processes a first macroblock. As previously discussed, the steps performed in conjunction with processing macroblock data may vary, across different video encoding standards and different embodiments.

With reference now to step 615, the transform engine writes the processed first macroblock to the quantization buffers and the reconstructed frame buffer. As with step 610, the specific buffers involved, as well as the format and type of data involved, may vary across different video encoding standards and different embodiments.

With reference now to step 620, the transform engine begins processing a second macroblock. As noted earlier, one advantage of including buffers between modules is to enable them to operate independently, and hence more efficiently. The transform engine is not forced to wait for the entropy encoder to accept the first macroblock, before beginning work on the second.

With reference now to step 622, if the entropy encoder detects an error, it sends a rewind signal indicating the nature of the error. The entropy encoder may routinely send a signal, providing status information regarding the processing of macroblock data, and including a status flag to indicate any errors; alternatively, the entropy encoder may only send a signal when an error occurs.

With reference now to step 624, the transform engine stops processing the second macroblock. In many video standards, the processing of a macroblock depends upon how the preceding macroblocks were processed, such that it may not be possible to complete the processing of the second macroblock, if the first was rejected and may change during reprocessing. In different embodiments, different actions may be involved in this step. For example, the software driver controlling the encoder may instruct the transform engine to cease processing; alternatively, a hardware rewind control module may be able to stop the transform engine, in response to a rewind signal from the entropy encoder.

With reference now to step 626, the transform engine reads from the buffers associated with the first macroblock. In different embodiments, this step may be accomplished in different ways. In one embodiment, for example, the software driver may force a reload of the necessary data into the transform buffers. In another embodiment, such as that of FIG. 5, the data for the first macroblock is still available, and a rewind control module directs the transform engine to the appropriate buffers.

With reference now to step 630, the transform engine reprocesses the first macroblock. In different embodiments, different error types may result in different actions.

With reference to step 632, if the rewind signal was the result of an IPCM error (or both an IPCM error and a bit-based error), the processed data produced by the transform engine was unacceptable large, e.g., larger than the unprocessed data was. In one embodiment, the transform engine provides the unprocessed data instead. In another embodiment, the transform engine may reprocess the first macroblock, using different input parameters to attempt to produce an acceptable output.

With reference to step 634, if the rewind signal was the result of a bit-based error, the current video data packet being prepared by the entropy encoder cannot include the processed first macroblock data. The first macroblock should be reprocessed, such that it can be included in the next video data packet.

With reference now to step 635, the reprocessed first macroblock is written to the quantization buffers.

With reference now to step 640, the transform engine begins processing the second macroblock. In some embodiments, the transform engine may be able to resume processing from a partially-processed state. In most embodiments, however, the processing of the second macroblock depends upon the first one, such that changes in how the first macroblock was processed will result in changes to how the second macroblock is processed.

Multistandard Rewind-Enabled Architecture

In some embodiments, multistandard video encoding support, such as previously described, can be combined with the hardware-enabled rewind functionality just described. In one such embodiment, the shared buffers include the multiple entries and control functionality necessary to enable the rewind function, as well as including the rewind signaling in the entropy encoder and the rewind control module.

Embodiments such as these provide the advantages of multistandard video encoding support, where redundant hardware can be limited and support for individual encoding standards can be more readily added or removed. These embodiments also provide hardware support for the rewind functionality described in several video encoding standards, which is helpful in attempting to provide real-time encoding for standards such as H.264. Those video standards which do not require a hardware rewind are not affected by including support for those standards which do.

Embodiments of the present invention are thus described. While the present invention has been described in particular embodiments, it should be appreciated that the present invention should not be construed as limited by such embodiments, but rather construed according to the following claims.

What is claimed is:

1. A method of encoding video data, comprising:
storing a first portion of video data at a first location in a buffer;
accessing said first portion of video data from said first location in said buffer;
performing an encoding operation on said first portion of video data;
obtaining a second portion of video data from a second location in said buffer;
beginning said encoding operation on said second portion of video data; and
retrieving said first portion of video data from said first location in said buffer;
re-performing said encoding operation on said first portion of video data retrieved from said first location, wherein said performing said encoding operation on said first portion of video data further comprises generating a first quantized portion of video data;
writing said first quantized portion of video data to a quantization buffer;
passing said first quantized portion of video data through an entropy encoder; and
receiving a rewind signal from said entropy encoder.

2. The method of claim 1, wherein said first portion of video data and said second portion of video data comprise macroblocks.

3. The method of claim 1, wherein said encoding operation comprises a forward transform operation.

4. The method of claim 1, wherein said retrieving and reprocessing are performed in response to said rewind signal.

5. The method of claim 1, wherein said rewind signal comprises an error signal indicating a bit-based encoding error.

6. The method of claim 1, wherein said rewind signal comprises an error signal indicating an intra pulse code modulation (IPCM) encoding error.

7. The method of claim 1, further comprising:
restarting said encoding operation on said second portion of video data.

8. A system for encoding video data, comprising:
a transform buffer for storing a plurality of processed macroblocks;
a transform engine, coupled to said transform buffer, for transforming said plurality of processed macroblocks into a plurality of quantized macroblocks, wherein said transform engine is further configured to:
write said first quantized portion of video data to a quantization buffer;
pass said first quantized portion of video data through an entropy encoder; and
receive a rewind signal from said entropy encoder; and
a rewind control module, coupled to said transform buffer, for causing said transform engine to retrieve one of said plurality of processed macroblocks stored in said transform buffer and transformed into a quantized macroblock, and re-transform said retrieved processed macroblock into a re-quantized macroblock.

9. The system of claim 8, wherein said rewind control module is operable to cause said transform engine to retrieve said one of said plurality of processed macroblocks from a specific location in said transform buffer.

10. The system of claim 8, further comprising:
a motion search module, for processing a plurality of raw video macroblocks into said plurality of processed macroblocks.

11. The system of claim 8, further comprising:
said entropy encoder, coupled to said transform engine, for encoding said plurality of quantized macroblocks.

12. The system of claim 11, wherein said entropy encoder is operable to send a rewind signal to said rewind control module.

13. The system of claim 8, wherein said system is operable to encode said video data in accordance with a version of the H.264 video compression standard.

14. The system of claim 8, wherein said transform engine comprises:
a plurality of transform datapaths operable to encode said video data in accordance with a plurality of video compression standards.

15. A handheld computer system device, comprising:
a system memory;
a central processing unit (CPU) communicatively coupled to said system memory; and
a graphics processing unit (GPU) communicatively coupled to said CPU, wherein said GPU includes an encoder for encoding a video data, and wherein said encoder is configured to:
store a first portion of video data at a first location in a buffer;
access said first portion of video data from said first location in said buffer;
perform an encoding operation on said first portion of video data;
obtain a second portion of video data from a second location in said buffer;
begin said encoding operation on said second portion of video data; and
retrieve said first portion of video data from said first location in said buffer;
re-perform said encoding operation on said first portion of video data, wherein said encoder is further configured to perform said encoding operation on said first portion of video data by generating a first quantized portion of video data;
write said first quantized portion of video data to a quantization buffer;
pass said first quantized portion of video data through an entropy encoder; and
receive a rewind signal from said entropy encoder.

16. The handheld computer system device of claim 15, wherein said retrieving and reprocessing are performed in response to said rewind signal.

* * * * *